UNITED STATES PATENT OFFICE.

WILLIAM BURTON, OF PLYMOUTH, WISCONSIN.

COMPOUND FOR KILLING CANADA THISTLES, &c.

SPECIFICATION forming part of Letters Patent No. 417,229, dated December 17, 1889.

Application filed August 3, 1889. Serial No. 319,670. (No specimens.)

*To all whom it may concern:*

Be it known that I, WILLIAM BURTON, of Plymouth, in the county of Sheboygan and State of Wisconsin, have invented new and useful Improvements in Compounds for Killing Thistles and other Weeds; and I do hereby declare the following to be a full, clear, and exact description of said invention.

My invention relates to improvements in compounds for killing Canada thistles, burdocks, and other noxious weeds.

The object of my invention is to provide a compound which will not only kill the stalks and leaves of that portion of the thistles and weeds above the ground, but which will also penetrate the roots and entirely destroy the weeds to which it is applied.

My compound consists of the following ingredients, combined in proportions and applied in the manner hereinafter stated, to wit: To one gallon of hot water, heated to or above the boiling temperature, add about one-fourth pint of soft soap, about one-eighth pint of kerosene-oil, and about one pint of common salt, which ingredients are stirred and thoroughly mixed together until the salt and soap are entirely dissolved, when the compound is applied to the thistles or other weeds when at or above the boiling temperature.

When the weeds or thistles have been sprinkled and thoroughly saturated with the above compound, I preferably sprinkle over them a small quantity of dry common salt. One application of this compound will in ordinary cases destroy the leaves and tops of the weeds within about twenty-four hours from its application, when a second application of the compound is applied in the same manner, preferably in about a week's time thereafter, which will penetrate and kill the roots.

The above-mentioned compound preferably includes, among other things, soft soap and kerosene-oil; but such elements of the compound are not absolutely necessary, as the weeds may be destroyed by the application of the hot water and salt alone; but from my experience with the several ingredients I preferably include all the elements of the compound, substantially as set forth.

In applying the above-mentioned compound it is preferably heated in an air-tight reservoir or boiler, as I am enabled thereby to heat the water to a much higher temperature than it would be possible to heat the same in an open receptacle. For convenience in applying the compound when heated, it may be conveyed in a wagon or other vehicle and the compound distributed through sprinklers communicating with the boiler or heater, whereby I am enabled to apply the compound rapidly in substantially the manner that streets are sprinkled.

Having thus described my invention and the manner of compounding and applying the same, what I claim as new, and desire to secure by Letters Patent, is—

As a new compound or composition of matter for destroying thistles and other noxious weeds, water, common salt, soft soap, and kerosene-oil, all intermixed together and applied substantially as and for the purpose specified.

In testimony whereof I affix my signature in presence of two witnesses.

WILLIAM BURTON.

Witnesses:
JAS. B. ERWIN,
ANNA FAUST.